G. E. DANIELS.
MEANS FOR TREATING SEED GRAIN.
APPLICATION FILED MAY 21, 1909.
946,205.
Patented Jan. 11, 1910.
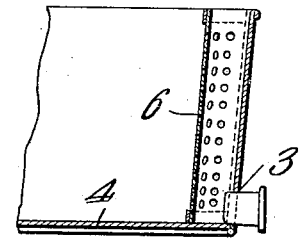
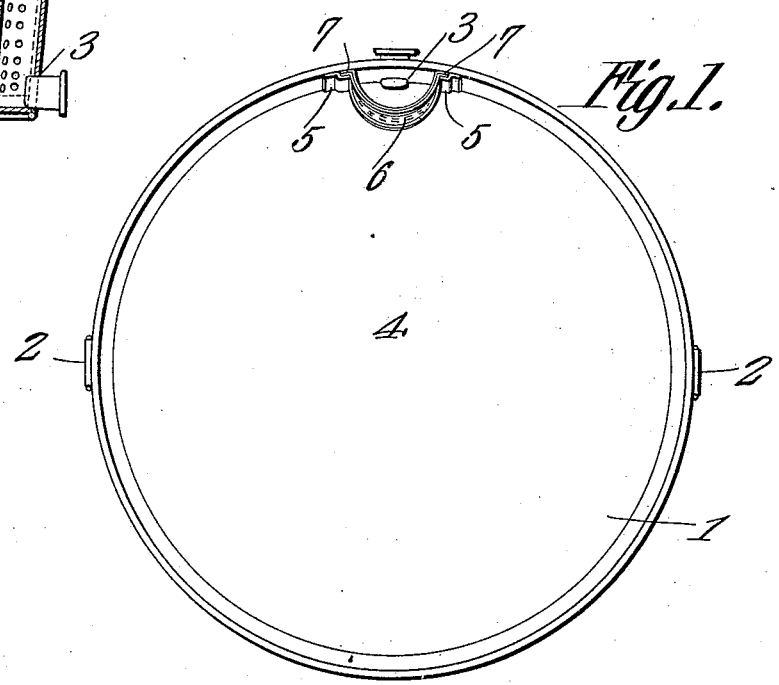
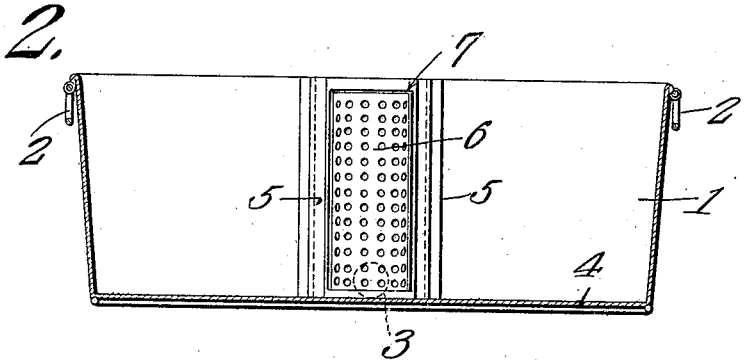
Witnesses
Inventor
George E. Daniels.
By C. A. Snow & Co.
Attorneys

UNITED STATES PATENT OFFICE.

GEORGE E. DANIELS, OF ELGIN, ILLINOIS.

MEANS FOR TREATING SEED-GRAIN.

946,205.   Specification of Letters Patent.   Patented Jan. 11, 1910.

Application filed May 21, 1909. Serial No. 497,407.

*To all whom it may concern:*

Be it known that I, GEORGE E. DANIELS, a citizen of the United States, residing at Elgin, in the county of Kane and State of Illinois, have invented a new and useful Means for Treating Seed-Grain, of which the following is a specification.

The present invention has relation to means for treating seed grain, and it consists in the novel construction and arrangement of its parts, as hereinafter shown and described.

The object of the invention is to provide a simple and an effective means whereby, preparatory to planting, seed may be economically treated for the purpose of killing or removing smut, or other objectionable growth therefrom.

As above indicated, the subject matter of the present invention includes means for economically treating the seed as indicated, and is an improvement over means heretofore employed, in that in the use of the predecessors of the present invention, much time and labor is unnecessarily consumed, and which is saved when the invention hereinafter to be described is employed.

In the accompanying drawings:—Figure 1 is a plan view of the means for treating grain. Fig. 2 is a transverse sectional view of the same. Fig. 3 is a detail sectional view through a screen used therein.

The means for treating grain includes a receptacle 1, which is preferably in the form of a tub, and which is provided at its diametrically opposite sides with handles 2, of usual pattern. The said receptacle 1 is provided in its side and in a plane at right angles to a plane passing through the center of the receptacle and the middle of the handles 2 with an outlet port 3. The said port is located at the lower portion of the side of the said receptacle, and just above the bottom of the said receptacle. Guides 5 are attached to the inner side of the side wall of the receptacle 1 and are located at equal distances beyond each side of the outlet port 3. A concaved screen 6 is provided with relatively plane edge portions 7, which are adapted to engage the guides 5, and the said screen is of sufficient height to bear at one end against the bottom 4 of the receptacle 1, while its opposite end portion is approximately flush, or at the same level with the upper ends of the guides 5. Inasmuch as the said screen 6 is concaved, its intermediate portion is bowed away from the inner side of the receptacle 1 which lies between the guides 5, and consequently sufficient passage is afforded between the said screen 6 and that portion of the side of the receptacle 1 lying between the guides 5 to permit liquid which passes through the upper portion of the said screen 6 to freely flow down and out through the port 3 in the side of the receptacle 1.

In practice, the means is manipulated as follows: Grain containing smut or other growth desired to be destroyed or removed is placed in the receptacle 1, containing a solution of water and sulfate of copper, or its equivalent; or the said solution may be poured directly into the receptacle 1, upon the grain contained therein. After immersion of the grain for a sufficient time, the liquid solution may be conveniently withdrawn through the outlet at Fig. 3 either into a duplicate receptacle to the one herein described or into any other receptacle, and then the grain removed: when the receptacle is ready for use again, as before. The arrangement and configuration of the parts within the receptacle 1 is of importance, and especially adapts the device to be economically used for the purpose intended, and for convenience of operation, the said receptacle 1, together with its contents and the solution may stand, or be placed in an inclined position as indicated, whereby the outlet port 3 is located at the lowest point of the receptacle 1, and the solution may drain through the grain directly toward the screen 6, through the screen to reach the outlet port 3. Inasmuch as the said screen 6 is concaved and its intermediate portion is spaced from the side of the receptacle 1, sufficient passageway is afforded, so that the solution, as it drains from the grain, may pass directly down and out through the outlet port 3. Thus considerable time is saved in draining the solution from the grain and at the same time nearly all, or approximately all, of the said solution is recovered, and the grain may be quickly dried for storage or planting purposes.

In addition to the advantageous features incident to the saving of time and labor as above indicated it will also be seen that the parts of the means for treating the grain are simple and may be compactly assembled when one or more sets of devices are shipped. When it is desired that the receptacle 1 should retain the solution of mixture as well as the grain the outlet port 3 may be closed by the insertion therein of a plug or cork, faucet or valve, as desired. It will also be seen that inasmuch as the outlet port 3 is located in the side of the receptacle 1 directly above the bottom 4 thereof with its lower edge flush with the plane of the upper face of the said bottom, practically, if not entirely all, of the said solution with which the said grain is treated may be recovered when the receptacle is positioned in an inclined posture, as stated.

Having described my invention, what I claim as new, and desire to secure, by Letters Patent, is:—

A means for treating grain comprising a receptacle having in its side an outlet port, the lower edge of which is flush with the plane of the upper surface of the bottom of the receptacle, guides located against the inner face of the side of the receptacle, and at equal distances from the sides of the said outlet port, a concaved screen having approximately plane edge portions adapted to engage the guides, said screen being of such length as to bear at its lower end upon the bottom of the receptacle when its upper end is at the same level or flush with the upper ends of the guides, said screen having its concaved intermediate portion spaced away from the inner face of the side of the receptacle lying between the guides when the said screen is in position in the guides, and the lower portion of the concaved intermediate section of the screen is spaced from the inner edge of the outlet port of the said receptacle.

In testimony that I claim the foregoing as my own, I have hereto affixed my signature in the presence of two witnesses.

GEORGE E. DANIELS.

Witnesses:
JAMES PAGE,
J. DERMODY.